(12) United States Patent
Chang et al.

(10) Patent No.: US 9,571,293 B2
(45) Date of Patent: Feb. 14, 2017

(54) MOBILE COMMUNICATION METHOD, MOBILE TERMINAL, RADIO BASE STATION, AND PROGRAM

(75) Inventors: Henry Chang, San Diego, CA (US); Noriyoshi Fukuta, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 25 days.

(21) Appl. No.: 14/238,459

(22) PCT Filed: Aug. 10, 2012

(86) PCT No.: PCT/JP2012/070452
§ 371 (c)(1),
(2), (4) Date: Feb. 11, 2014

(87) PCT Pub. No.: WO2013/024806
PCT Pub. Date: Feb. 21, 2013

(65) Prior Publication Data
US 2014/0211683 A1    Jul. 31, 2014

Related U.S. Application Data

(60) Provisional application No. 61/523,131, filed on Aug. 12, 2011.

(51) Int. Cl.
*H04L 12/18* (2006.01)
*H04W 48/12* (2009.01)
*H04W 4/06* (2009.01)

(52) U.S. Cl.
CPC ......... *H04L 12/1845* (2013.01); *H04L 12/189* (2013.01); *H04W 48/12* (2013.01); *H04W 4/06* (2013.01)

(58) Field of Classification Search
CPC .... H04W 4/06; H04W 68/00; H04W 52/0216; H04L 12/189; Y02B 60/50
See application file for complete search history.

(56) References Cited

U.S. PATENT DOCUMENTS

2006/0183498 A1* 8/2006 Lee .................. H04W 36/0072
455/552.1
2006/0268774 A1* 11/2006 Kangas ............... H04L 12/1877
370/329

(Continued)

FOREIGN PATENT DOCUMENTS

| EP | 2043404 A1 | 4/2009 |
| JP | 2010-157918 A | 7/2010 |
| WO | 2010/125853 A1 | 11/2010 |

OTHER PUBLICATIONS

International Search Report; PCT/JP2012/070452; Sep. 4, 2012.
(Continued)

*Primary Examiner* — Jung-Jen Liu
(74) *Attorney, Agent, or Firm* — Studebaker & Brackett PC

(57) ABSTRACT

A mobile communication method comprises: a step A of broadcasting, from a specific cell, MBMS service update information indicating a timing of a broadcasting of MBMS service information indicating contents of MBMS data; a step B of broadcasting, from the specific cell, the MBMS service information at the timing indicated by the MBMS service update information; and a step C of receiving, by the mobile terminal existing in the specific cell, the MBMS service information broadcasted from the specific cell at the timing indicated by the MBMS service update information broadcasted from the specific cell.

5 Claims, 5 Drawing Sheets

(56) References Cited

U.S. PATENT DOCUMENTS

| | | | |
|---|---|---|---|
| 2010/0157872 A1* | 6/2010 | Hyun | H04L 12/1886 |
| | | | 370/312 |
| 2010/0265867 A1* | 10/2010 | Becker | H04W 72/005 |
| | | | 370/312 |
| 2012/0040705 A1 | 2/2012 | Shindo | |
| 2012/0236776 A1* | 9/2012 | Zhang | H04W 48/12 |
| | | | 370/312 |
| 2014/0010142 A1* | 1/2014 | Ranta-Aho | H04W 36/0061 |
| | | | 370/312 |

OTHER PUBLICATIONS

3GPP TS 36.300 V9.4.0 (Jun. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9); pp. 1-170.

3GPP TSG-RAN WG2 #75, R2-114094; Kyocera; "Selection/Reselection between MBMS capable and non-MBMS capable cells"; Athens, Greece, Aug. 22-26, 2011; pp. 1-3.

The extended European search report issued by the European Patent Office on Apr. 29, 2015, which corresponds to European Patent Application No. 12824584.2-1854 and is related to U.S. Appl. No. 14/238,459.

Samsung: "Baseline CR Capturing MBMS for LTE agreements"; 3GPP Draft; 36331_CR0257R5 (REL-9) R2-097507; Baseline CR Capturing LTE MBMS Agreements; 3rd Generation Partnership Project (3GPP); Mobile Competence Centre; 650, Route Des Lucrioles; F-06921 Sophia-Antipolis Cedex; France; Nov. 9, 2009; pp. 1-14.

\* cited by examiner

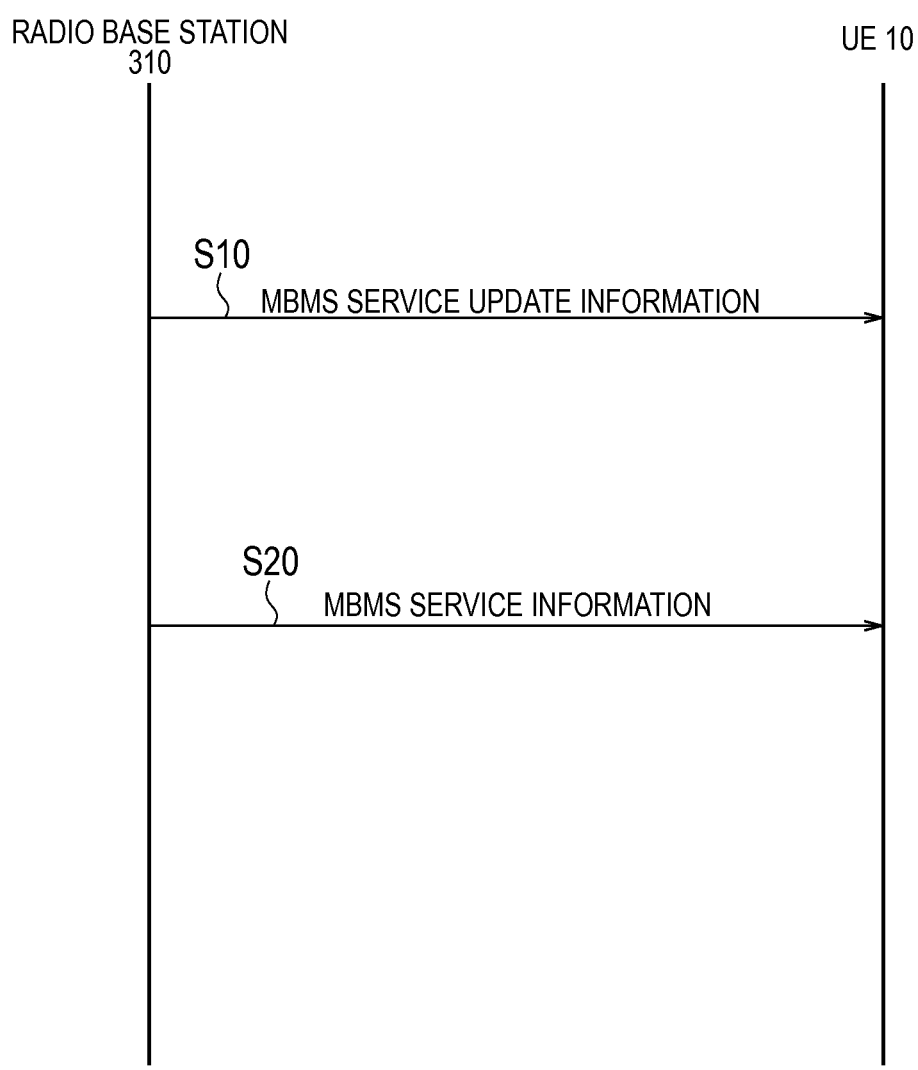

MOBILE COMMUNICATION METHOD, MOBILE TERMINAL, RADIO BASE STATION, AND PROGRAM

This application claims the benefit of priority from U.S. Provisional Application No. 61/523131 (filed on Aug. 12, 2011), the entire contents of which are incorporated herein by reference.

TECHNICAL FIELD

The present invention relates to a mobile communication method, a mobile terminal, a radio base station, and a program, which are applied to a mobile communication system including a general cell supporting a broadcasting of MBMS data and a specific cell not supporting the broadcasting of the MBMS data.

BACKGROUND ART

In the conventional art, a general cell (for example, a macro cell) supporting a broadcasting of MBMS data has been known. Furthermore, a specific cell called a CSG (Closed Subscriber Group) cell, a home cell, a femto cell and the like has also been known.

In addition, it is possible to set an access type in the specific cell. The access type includes "Closed", "Hybrid", or "Open".

Here, the specific cell does not support the broadcasting of the MBMS data. Accordingly, if handover from the general cell to the specific cell or cell selection is performed, it is not possible for a mobile terminal to acquire information on the MBMS data in the specific cell.

CITATION LIST

Patent Literature

Patent literature 1 3GPP TS 36.300 V9.4.0

SUMMARY OF THE INVENTION

A mobile communication method according to a first feature is a method for distributing MBMS data to a mobile terminal in a mobile communication system including a general cell supporting a broadcasting of the MBMS data and a specific cell not supporting the broadcasting of the MBMS data. The mobile communication method comprises: a step A of broadcasting, from the specific cell, MBMS service update information indicating a timing of a broadcasting of MBMS service information indicating contents of the MBMS data; a step B of broadcasting, from the specific cell, the MBMS service information at the timing indicated by the MBMS service update information; and a step C of receiving, by the mobile terminal existing in the specific cell, the MBMS service information broadcasted from the specific cell at the timing indicated by the MBMS service update information broadcasted from the specific cell.

A mobile terminal according to a second feature receives MBMS data in a mobile communication system including a general cell supporting a broadcasting of the MBMS data and a specific cell not supporting the broadcasting of the MBMS data. The mobile terminal comprises: a receiver that receives, from the specific cell, MBMS service update information indicating a timing of a broadcasting of MBMS service information indicating contents of the MBMS data. The receiver receives, from the specific cell, the MBMS service information broadcasted from the specific cell at the timing indicated by the MBMS service update information broadcasted from the specific cell.

A radio base station according to a third feature manages a specific cell in a mobile communication system including a general cell supporting a broadcasting of MBMS data and the specific cell not supporting the broadcasting of the MBMS data. The radio base station comprises: a broadcasting unit that broadcasts MBMS service update information indicating a timing of a broadcasting of MBMS service information indicating contents of the MBMS data. The broadcasting unit broadcasts the MBMS service information at the timing indicated by the MBMS service update information.

A program according to a fourth feature is used in a mobile terminal that receives MBMS data in a mobile communication system including a general cell supporting a broadcasting of the MBMS data and a specific cell not supporting the broadcasting of the MBMS data. The program causing a computer to execute: a step of receiving, from the specific cell, MBMS service update information indicating a timing of a broadcasting of MBMS service information indicating contents of the MBMS data; and a step of receiving, from the specific cell, the MBMS service information broadcasted from the specific cell at the timing indicated by the MBMS service update information broadcasted from the specific cell.

BRIEF DESCRIPTION OF THE DRAWINGS

FIG. 6 is a sequence diagram illustrating a mobile communication method according to the first embodiment.

DESCRIPTION OF THE EMBODIMENTS

Figure 1:
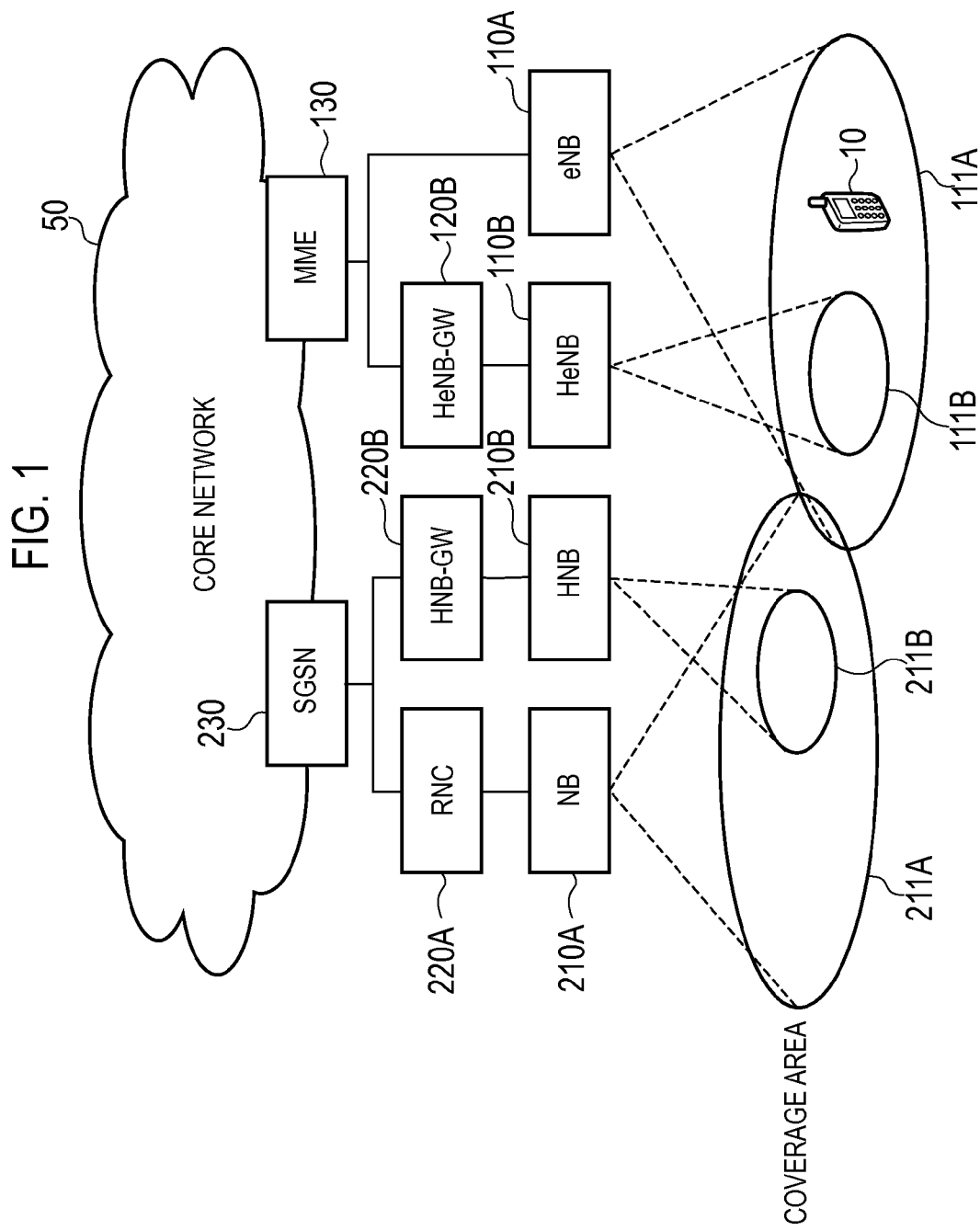
FIG. 1 is a diagram illustrating a mobile communication system 100 according to a first embodiment.

Hereinafter, a description will be given of the mobile communication system according to the embodiments of the present invention, with reference to the drawings. Note that the same or similar reference signs are applied to the same or similar portions in the drawings.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

[Summary of the Embodiment]

A mobile communication method according to an embodiment is a method for distributing MBMS data to a mobile terminal in a mobile communication system including a general cell supporting a broadcasting of the MBMS data and a specific cell not supporting the broadcasting of the MBMS data. The mobile communication method comprises: a step A of broadcasting, from the specific cell, MBMS service update information indicating a timing of a broadcasting of MBMS service information indicating contents of the MBMS data; a step B of broadcasting, from the specific cell, the MBMS service information at the timing indicated by the MBMS service update information; and a step C of receiving, by the mobile terminal existing in the specific cell, the MBMS service information broadcasted from the specific cell at the timing indicated by the MBMS service update information broadcasted from the specific cell.

In the embodiment, since MBMS service information and MBMS service update information are broadcasted from a specific cell, it is possible for a mobile terminal to receive MBMS service information broadcasted from the specific cell. Accordingly, even when a standby cell is the specific cell, it is possible for the mobile terminal to continuously acquire information (the MBMS service information) on MBMS data.

In the embodiment, the specific cell is preferred to be a cell that is deployed as a small-size cell and a large-size cell. The specific cell is preferred to be a cell that is managed by HNB (Home Node B), HeNB (Home Evolved Node B), a femto BTS, and the like. That is, radio base stations managing the specific cell are the HNB, the HeNB, the femto BTS, and the like.

[First Embodiment]

(Mobile Communication System)

Hereinafter, a mobile communication system according to a first embodiment will be described. FIG. 1 is a diagram illustrating a mobile communication system 100 according to a first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system, for example, is a communication system corresponding to LTE (Long Term Evolution). The first communication system, for example, includes a base station 110A (hereinafter, eNB 110A), a home base station 110B (hereinafter, HeNB 110B), a home base station gateway 120B (hereinafter, HeNB-GW 120B), and an MME 130.

A radio access network (E-UTRAN; Evolved Universal Terrestrial Radio Access Network) corresponding to the first communication system is configured from the eNB 110A, the HeNB 110B, and the HeNB-GW 120B.

The second communication system, for example, is a communication system corresponding to UMTS (Universal Mobile Telecommunication System). The second communication system includes abase station 210A (hereinafter, NB 210A), a home base station 210B (hereinafter, HNB 210B), an RNC 220A, a home base station gateway 220B (hereinafter, HNB-GW 220B), and an SGSN 230.

A radio access network (UTRAN; Universal Terrestrial Radio Access Network) corresponding to the second communication system is configured from the NB 210A, the HNB 210B, the RNC 220A, and the HNB-GW 220B.

The UE 10 is a device (User Equipment) configured to communicate with the second communication system or the first communication system. For example, the UE 10 has a function of performing radio communication with the eNB 110A and the HeNB 110B. Alternatively, the UE 10 has a function of performing radio communication with the NB 210A and the HNB 210B.

The eNB 110A, managing a general cell 111A, is a device (evolved NodeB) that performs radio communication with the UE 10 being present in the general cell 111A.

The HeNB 110B, managing a specific cell 111B, is a device (Home evolved NodeB) that performs radio communication with the UE 10 being present in the specific cell 111B.

The HeNB-GW 120B, connected to the HeNB 110B, is a device (Home evolved NodeB Gateway) that manages the HeNB 110B.

The MME 130, connected to the eNB 110A, is a device (Mobility Management Entity) that manages the mobility of the UE 10 having set up a radio connection with the HeNB 110B. Furthermore, the MME 130, connected to the HeNB 110B via the HeNB-GW 120B, is a device that manages the mobility of the UE 10 having set up a radio connection with the HeNB 110B.

The NB 210A, managing a general cell 211A, is a device (NodeB) that performs radio communication with the UE 10 being present in the general cell 211A.

The HNB 210B, managing a specific cell 211B, is a device (Home NodeB) that performs radio communication with the UE 10 being present in the specific cell 211B.

The RNC 220A, connected to the NB 210A, is a device (Radio Network Controller) that sets up a radio connection (RRC Connection) with the UE 10 being present in the general cell 211A.

The HNB-GW 220B, connected to the HNB 210B, is a device (Home NodeB Gateway) that sets up a radio connection (RRC Connection) with the UE 10 being present in the specific cell 211B.

The SGSN 230 is a device (Serving GPRS Support Node) that performs packet switching in a packet switching domain. The SGSN 230 is provided in the core network 50. Although not illustrated in FIG. 1, a device (MSC; Mobile Switching Center) that performs circuit switching in a circuit switching domain may be provided in the core network 50.

Furthermore, the general cell and the specific cell must be understood as functions of performing radio communication with the UE 10. However, the general cell and the specific cell are also used as terms indicating coverage areas of cells. Also, cells such as the general cell and the specific cell are identified based on the frequency used in the cell, the spreading code, the time slot, or the like.

The specific cell is also referred to as a femto cell, a CSG (Closed Subscriber Group) cell, a home cell, and the like. The specific cell is configured to enable the setup of an access type for defining the UE 10 that can access the specific cell. The access type is "Closed", "Hybrid", or "Open".

A "Closed" specific cell is configured to allow only the provision of service to the UE 10 (UE; User Equipment) managed by the specific cell.

A "Hybrid" specific cell, for example, is configured to allow high-quality communications for the UE 10 managed by the specific cell, and is also configured to allow communications of best-effort quality for the UE 10 not managed by the specific cell.

An "Open" specific cell is configured to allow the provision of service to all the UE 10s, in the same way as the general cell. In an "Open" cell, the difference in the quality of communications between the UE 10s is not differentiated depending on whether or not the UE 10 is managed by the specific cell.

The access type can also be "ACCESS CLASS BARRED" in which the UE 10 access is prohibited for each access class, or "CELL BARRED" in which the UE 10 access is prohibited for each cell.

Hereinafter, the first communication system will be mainly described. The following description may also be applied to the second communication system.

Here, in the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, an uplink channel includes an uplink control channel (PUCCH; Physical Uplink Control Channel), an uplink shared channel (PUSCH; Physical Uplink Shared Channel), and the like. Furthermore, a downlink channel includes a downlink control channel (PDSCH; Physical Downlink Control Channel), a downlink shared channel (PDSCH; Physical Downlink Shared Channel), and the like.

The uplink control channel is a channel used to transfer a control signal. The control signal, for example, includes CQI (Channel Quality Indicator), PMI (Precoding Matrix Indicator), RI (Rank Indicator), SR (Scheduling Request), and ACK/NACK.

The CQI is a signal for notifying a recommended modulation method and a coding rate to be used in downlink transmission. The PMI is a signal indicating a precoder matrix which is preferably used in downlink transmission. The RI is a signal indicating the number of layers (the number of streams) to be used in downlink transmission. The SR is a signal for requesting the assignment of an uplink radio resource (a resource block which will be described later). The ACK/NACK is a signal indicating whether a signal transmitted via the downlink channel (for example, the PDSCH) has been successfully received.

The uplink shared channel is a channel used to transfer a control signal (includes the above-mentioned control signal) and/or a data signal. For example, the uplink radio resource may be assigned only to the data signal, or assigned such that the data signal and the control signal are multiplexed.

The downlink control channel is a channel used to transfer a control signal. The control signal, for example, includes Uplink SI (Scheduling Information), Downlink SI (Scheduling Information), and a TPC bit.

The Uplink SI is a signal indicating the assignment of the uplink radio resource. The Downlink SI is a signal indicating the assignment of a downlink radio resource. The TPC bit is a signal for instructing increase or decrease in the power of a signal transmitted via the uplink channel.

The downlink shared channel is a channel used to transfer a control signal and/or a data signal. For example, the downlink radio resource may be assigned only to the data signal, or assigned such that the data signal and the control signal are multiplexed.

In addition, a control signal transmitted via the downlink shared channel includes TA (Timing Advance). The TA is transmission timing correction information between the UE 10 and the eNB 110A, and is measured by the eNB 110A based on an uplink signal transmitted from the UE 10.

Furthermore, a control signal transmitted via a channel, other than the downlink control channel (the PDCCH) and the downlink shared channel (the PDSCH), includes ACK/NACK. The ACK/NACK is a signal indicating whether a signal transmitted via the uplink channel (for example, the PUSCH) has been successfully received.

In the first embodiment, the general cell is a cell supporting broadcasting of the MBMS data. The general cell broadcasts the MBMS service information indicating the content (program schedule) of the MBMS data. Alternatively, the general cell broadcasts the MBMS service change information indicating that the MBMS service information is changed, and also indicating the timing of change of the MBMS service information. For example, the general cell transmits the MBMS data via MTCH (Multicast Traffic Channel). Furthermore, the general cell transmits the MBMS service information indicating the content (program schedule) of the MBMS data, via MCCH (Multicast Traffic Channel). Alternatively, the general cell transmits the MBMS service information via the MTCH. Alternatively, the general cell transmits the MBMS service information via a broadcast channel as SIB.

In contrast to this, the specific cell is a cell that does not support the broadcasting of the MBMS data. Therefore, it must be noted that the specific cell does not have the function of broadcasting the MBMS data, and generally, the specific cell does not broadcast the MBMS service information or the MBMS service change information. However, the specific cell can transmit the MBMS data to a UE 10 in the connected state that is connected to the specific cell. For example, the specific cell can transmit the MBMS data by using PDSCH.

The general cell and the specific cell broadcast broadcast information via a broadcast channel (BCCH; Broadcast Control Channel). The broadcast information, for example, is information such as MIB (Master Information Block) or SIB (System Information Block).

(Radio Frame)

Figure 2:
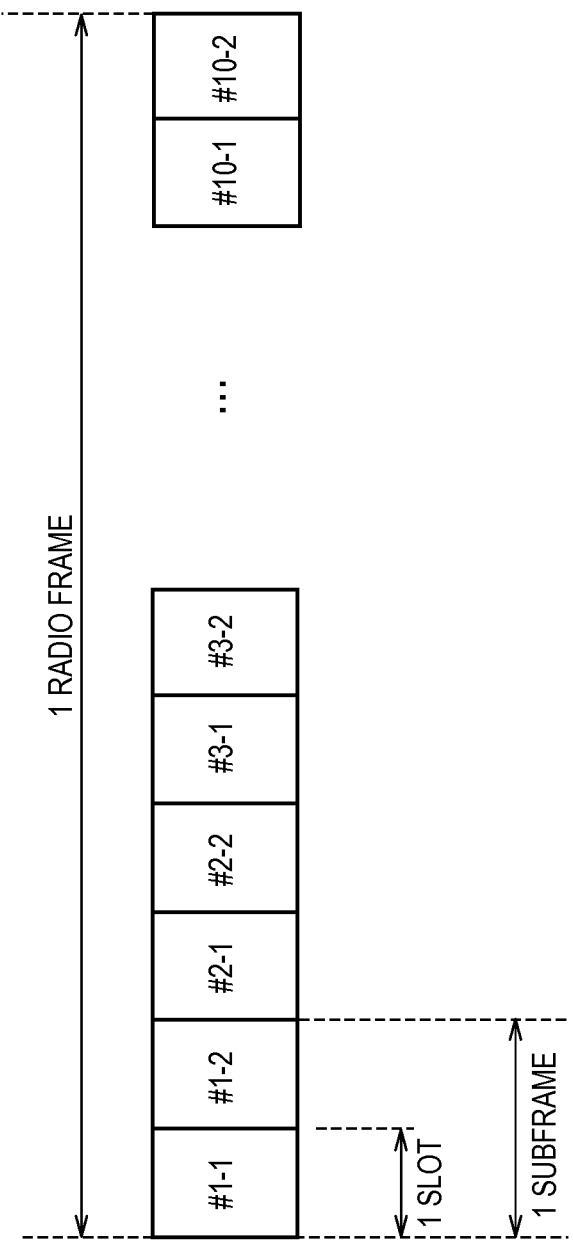
FIG. 2 is a diagram illustrating a radio frame according to the first embodiment.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in the downward direction. In the same manner, one slot is configured by a plurality of SC-FDMA symbols (for example, six SC-FDMA symbols or seven SC-FDMA symbols) in the upward direction.

(Radio Resource)

Figure 3:
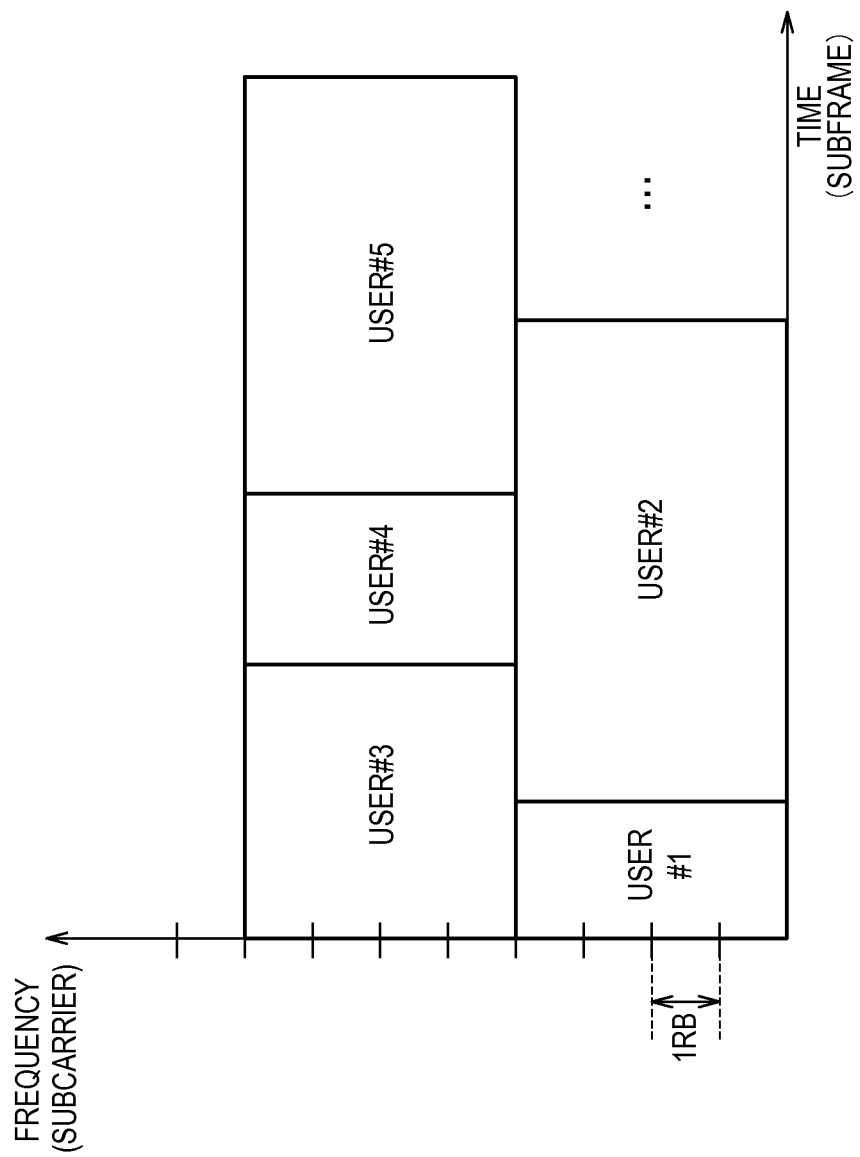
FIG. 3 is a diagram illustrating a radio resource according to the first embodiment.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each one resource block. Furthermore, on the frequency axis and the time axis, it is possible to divide the radio resources to assign the same to a plurality of users (for example, user #1 to user #5).

Furthermore, the radio resource is assigned by the eNB 110A. The eNB 110A assigns the radio resource to each UE 10 based on the CQI, the PMI, the RI, and the like.

(Mobile Communication Method)

Hereinafter, a mobile communication method according to a first embodiment will be described through the following cases. Three cases will be described below.

(First Case)

Hereinafter, a description will be provided for a case in which MBMS service information is broadcasted from a general cell and MBMS service update information is broadcasted from a specific cell. In addition, a UE 10 is existing in the specific cell. In addition, it is noted that the existing is a term indicating both an idle state and a connected state.

Specifically, in the first case, a mobile communication method includes: a step A of broadcasting MBMS service information indicating contents of MBMS data from the general cell; a step B of broadcasting MBMS service update information indicating an update of the MBMS service information and a timing of broadcasting the MBMS service information; a step C of broadcasting the MBMS service update information from the specific cell; and a step D of receiving, by the UE 10, the MBMS service information broadcasted from the general cell at the timing indicated by the MBMS service update information broadcasted from the specific cell.

Here, in the step C, it is preferable that the specific cell suspends a transmission of downlink data through a downlink shared channel during the period indicated by the MBMS service update information.

In this way, even when a frequency used in the specific cell is the same as or different from a frequency used in the general cell, since the MBMS service information broadcasted from the general cell is monitored, there is no problem that it is not possible to receive the downlink data transmitted from the specific cell through the downlink shared channel.

Furthermore, when the frequency used in the specific cell is the same as the frequency used in the general cell, interference between the downlink data transmitted from the specific cell through the downlink shared channel and the MBMS service information broadcasted from the general cell does not occur in the UE 10.

In the first case, the mobile communication method may further include a step E of acquiring the MBMS service update information through an interface of a mobile communication system. In addition, the interface of the mobile communication system includes an interface (an X2 interface) between base stations, an interface (an S1 interface) via a core network, and the like.

Alternatively, in the first case, the mobile communication method may further include a step E of acquiring, by the specific cell, the MBMS service update information by monitoring the MBMS service update information broadcasted from the general cell. In such a case, when the frequency used in the specific cell is the same as the frequency used in the general cell, the specific cell may control the UE 10 existing in the specific cell so as to suspend a transmission of uplink data during the period where the MBMS service update information is broadcasted from the general cell. For example, the specific cell transmits a suspension instruction of the transmission of the uplink data to the UE 10 during the period where the MBMS service update information is broadcasted from the general cell. In this way, interference between the uplink data transmitted from the UE 10 and the MBMS service update information broadcasted from the general cell does not occur in the specific cell.

(Second Case)

Hereinafter, a description will be provided for a case in which the MBMS service information and the MBMS service update information are broadcasted from the specific cell. In addition, a UE 10 is existing in the specific cell . In addition, it is noted that the existing is a term indicating both an idle state and a connected state.

Specifically, in the second case, a mobile communication method includes: a step A of broadcasting MBMS service update information indicating a timing of broadcasting of MBMS service information indicating contents of MBMS data, from the specific cell; a step B of broadcasting the MBMS service information at the timing indicated by the MBMS service update information, from the specific cell; a step C of receiving, by a mobile terminal existing in the specific cell, the MBMS service information broadcasted from the specific cell at the timing indicated by the MBMS service update information broadcasted from the specific cell. Here, the MBMS service update information may include information indicating that the MBMS service information is broadcasted. The MBMS service update information may include information indicating that the MBMS service information is updated.

In the second case, the mobile communication method may further include a step E of acquiring the MBMS service information through an interface of a mobile communication system. In addition, the interface of the mobile communication system includes an interface (an X2 interface) between base stations, an interface (an S1 interface) via a core network, and the like.

Alternatively, in the second case, the mobile communication method may further include a step E of acquiring, by the specific cell, the MBMS service information by monitoring the MBMS service information broadcasted from the general cell. For example, the specific cell monitors MBMS service update information broadcasted from the general cell, specifies the timing where the MBMS service information is broadcasted from the general cell, monitors the MBMS service information during the specified timing, and acquires the MBMS service information. In such a case, when a frequency used in the specific cell is the same as a frequency used in the general cell, the specific cell may control the UE 10 existing in the specific cell so as to suspend a transmission of uplink data during the timing where the MBMS service information is broadcasted from the general cell. For example, the specific cell may transmit a suspension instruction of the transmission of the uplink data to the UE 10 at the timing where the MBMS service information is broadcasted from the general cell. In such a case, the specific cell may control the UE 10 existing in the specific cell so as to suspend the transmission of the uplink data at the timing where the MBMS service update information is broadcasted from the general cell. For example, the specific cell may transmit a suspension instruction of the transmission of the uplink data to the UE 10 at the timing where the MBMS service update information is broadcasted from the general cell. In this way, interference between the uplink data transmitted from the UE 10 and the MBMS service information broadcasted from the general cell does not occur in the specific cell.

In addition, in the second case, since the MBMS service update information is broadcasted from the specific cell, it is possible for the specific cell to arbitrarily set the timing where the MBMS service information is broadcasted from the specific cell. In other words, a broadcasting timing of the MBMS service information from the specific cell may be different from a broadcasting timing of the MBMS service information from the general cell. That is, the contents of the MBMS service update information from the specific cell may be different from the contents of the MBMS service update information broadcasted from the general cell.

(Third Case)

Hereinafter, a description will be provided for a case in which the MBMS service information is transmitted from the specific cell in a unicast manner. In addition, the UE 10 is in a connected state in the specific cell.

Specifically, in the third case, a mobile communication method includes: a step A of broadcasting the MBMS service information indicating contents of MBMS data from the general cell; a step B of acquiring, by the specific cell, the MBMS service information from the general cell and transmitting, by the specific cell, the MBMS service information to a mobile terminal connected to the specific cell; and a step C of receiving, by the mobile terminal connected to the specific cell, the MBMS service information from the specific cell.

In the third case, the mobile communication method may further include a step D of acquiring the MBMS service information through an interface of a mobile communication system. In addition, the interface of the mobile communication system includes an interface (an X2 interface) between base stations, an interface (an S1 interface) via a core network, and the like.

Alternatively, in the third case, the mobile communication method may further include a step D of acquiring, by the specific cell, the MBMS service information by monitoring the MBMS service information broadcasted from the general cell. For example, the specific cell monitors MBMS service update information broadcasted from the general cell, specifies the timing where the MBMS service information is broadcasted from the general cell, monitors the MBMS service information during the specified timing, and acquires the MBMS service information. In such a case, when a frequency used in the specific cell is the same as a frequency used in the general cell, the specific cell may control the UE 10 existing in the specific cell so as to suspend a transmission of uplink data at the timing where the MBMS service information is broadcasted from the general cell. For example, the specific cell may transmit a suspension instruction of the transmission of the uplink data to the UE 10 at the timing where the MBMS service information is broadcasted from the general cell. In such a case, the specific cell may control the UE 10 existing in the specific cell so as to suspend the transmission of the uplink data at the timing where the MBMS service update information is broadcasted from the general cell. For example, the specific cell may transmit a suspension instruction of the transmission of the uplink data to the UE 10 at the timing where the MBMS service update information is broadcasted from the general cell. In this way, interference between the uplink data transmitted from the UE 10 and the MBMS service information broadcasted from the general cell does not occur in the specific cell.

In addition, in the third case, since the MBMS service information is transmitted in the unicast manner, it is noted that it is not necessary to broadcast the MBMS service update information from the specific cell.

(Radio Base Station)

Figure 4:
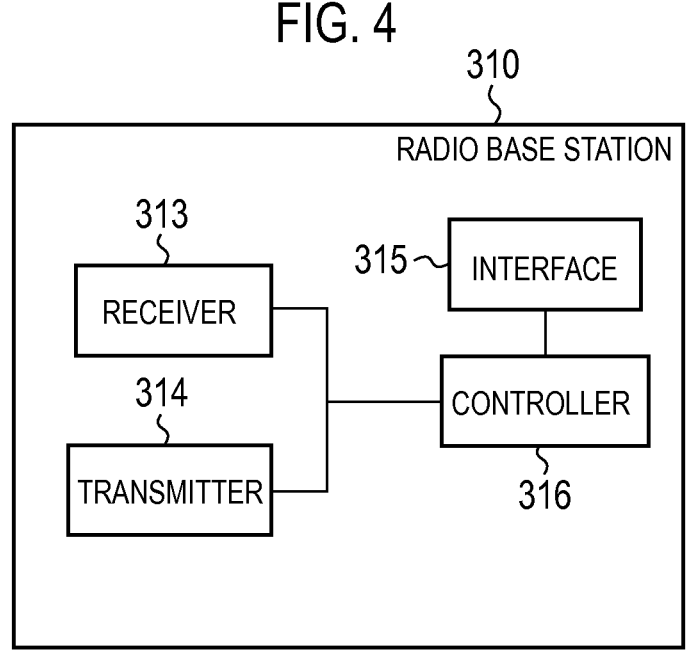
FIG. 4 is a block diagram illustrating a radio base station 310 according to the first embodiment.

Hereinafter, a radio base station according to a first embodiment will be described. FIG. 4 is a block diagram illustrating a radio base station 310 according to the first embodiment. Here, aforementioned case 2 will be described mainly. The radio base station 310 is a radio base station managing a specific cell. The radio base station 310 may be the eNB 110A or HeNB 110B.

As illustrated in FIG. 4, the radio base station 310 includes a receiver 313, a transmitter 314, an interface 315, and a controller 316.

The receiver 313 receives an uplink signal from the UE 10 connected to the cell managed by the radio base station 310. The receiver 313 receives the uplink signal via an uplink shared channel (PUSCH), for example.

The transmitter 314 transmits a downlink signal to the UE 10 connected to the cell managed by the radio base station 310. The transmitter 314 transmits MBMS service update information indicating a timing of broadcasting of MBMS service information indicating contents of MBMS data. The transmitter 314 transmits the MBMS service information at the timing indicated by the MBMS service update information. In the first embodiment, the transmitter 314 configures a broadcasting unit that broadcasts the MBMS service update information and the MBMS service information.

Here, the MBMS service update information is information (SIB) broadcasted by using a broadcast channel. The MBMS service information is information (SIB) broadcasted by using a broadcast channel. Here, the MBMS service update information may include information indicating that the MBMS service information is broadcasted. The MBMS service update information may include information indicating that the MBMS service information is updated.

The interface 315 is an interface that communicates with other radio base station via a backhaul network. The interface 315 is X2 interface that directly connects radio base stations each other. Alternatively, the interface 315 is S1 interface that connects radio base stations each other via an upper node (for example, MME).

The controller 316 controls operations of the radio base station 310. The controller 316 allocates a radio resource to the UE 10, for example.

(Mobile Terminal)

Figure 5:
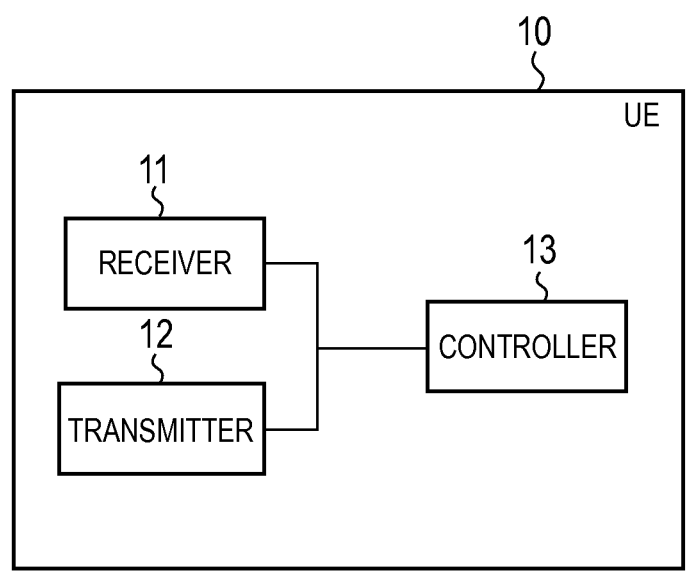
FIG. 5 is a block diagram illustrating a UE 10 according to the first embodiment.

Hereinafter, a mobile terminal according to a first embodiment will be described. FIG. 5 is a block diagram illustrating a UE 10 according to the first embodiment. Here, aforementioned case 2 will be described mainly. As illustrated in FIG. 5, the UE 10 includes a receiver 11, a transmitter 12, and a controller 13.

The receiver 11 receives a downlink signal from the radio base station 310 (specific cell). The receiver 11 receives the MBMS service update information indicating a timing of broadcasting of MBMS service information indicating contents of MBMS data. The receiver 11 receives the MBMS service information at the timing indicated by the MBMS service update information.

As described above, the MBMS service update information and the MBMS service information are broadcasted from the radio base station 310 (specific cell).

The transmitter 12 transmits an uplink signal to the radio base station 310. The transmitter 12 transmits the uplink signal via an uplink shared channel (PUSCH), for example.

The controller 13 controls operations of the UE 10. The controller 13 controls the transmission of the uplink signal and the reception of the downlink signal, by using the radio resource allocated by the radio base station 310, for example.

(Mobile Communication Method)

Hereinafter, a mobile communication method according to a first embodiment will be described. FIG. 6 is a sequence diagram illustrating the operation of the mobile communication system 100 according to the first embodiment. Here, aforementioned case 2 will be described mainly.

As illustrated in FIG. 6, in step S10, the radio base station 310 (specific cell) broadcasts the MBMS service update information indicating a timing of broadcasting of MBMS service information indicating contents of MBMS data. On the other hand, the UE 10 receives the MBMS service update information indicating a timing of broadcasting of MBMS service information indicating contents of MBMS data. In step S20, the radio base station 310 (specific cell)

broadcasts the MBMS service information at the timing indicated by the MBMS service update information. On the other hand, the UE 10 receives the MBMS service information at the timing indicated by the MBMS service update information.

(Operation and Effect)

In the first case, since the MBMS service update information is broadcasted from the specific cell, it is possible for the mobile terminal to receive the MBMS service information broadcasted from the general cell. Accordingly, even when a standby cell is the specific cell, it is possible for the mobile terminal to continuously acquire information (the MBMS service information) on MBMS data.

In the second case, since the MBMS service information and the MBMS service update information are broadcasted from the specific cell, it is possible for the mobile terminal to receive the MBMS service information broadcasted from the specific cell. Accordingly, even when a standby cell is the specific cell, it is possible for the mobile terminal to continuously acquire information (the MBMS service information) on MBMS data.

In the third case, the MBMS service information is transmitted from the specific cell to the mobile terminal connected to the specific cell. That is, the MBMS service information is transmitted from the specific cell to the mobile terminal in a unicast manner. Accordingly, even when a connection cell is the specific cell, it is possible for the mobile terminal to continuously acquire information (the MBMS service information) on the MBMS data.

[Other Embodiments]

The present invention is explained through the above embodiment, but it must not be understood that this invention is limited by the statements and the drawings constituting a part of this disclosure. From this disclosure, various alternative embodiments, examples, and operational technologies will become apparent to those skilled in the art.

Although not particularly mentioned in the embodiment, a program for causing a computer to execute each step performed by the UE 10 may be provided. Alternatively, a processor for executing each step (the program) performed by the UE 10 may be provided. The program may be stored in computer readable media. The program can be installed in a computer by using the computer readable media. Here, the computer readable media may be non-transitory storage media. The non-transitory storage media may be CD-ROM or DVD-ROM, for example.

INDUSTRIAL APPLICABILITY

With the present invention, it is possible for mobile terminal to continuously receive information (MBMS service information) on MBMS data even when the standby cell is the specific cell.

The invention claimed is:

1. A mobile communication method for distributing MBMS data to a mobile terminal in a mobile communication system including a general cell supporting a broadcasting of the MBMS data and a specific cell not supporting the broadcasting of the MBMS data, comprising:
   directly acquiring, by a specific base station corresponding to the specific cell, service information for MBMS from a general base station corresponding to the general cell via an interface between base stations;
   broadcasting, from the specific cell, system information indicating a timing at which the specific cell broadcasts the service information;
   broadcasting, from the specific cell, the service information at the timing indicated by the system information; and
   receiving, by the mobile terminal existing in the specific cell, the service information broadcasted from the specific cell at the timing indicated by the system information broadcasted from the specific cell.

2. The mobile communication method according to claim 1, wherein the system information includes information indicating that the service information is updated.

3. A mobile terminal that receives MBMS data in a mobile communication system including a general cell supporting a broadcasting of the MBMS data and a specific cell not supporting the broadcasting of the MBMS data, comprising:
   a processor configured to
   receive, from the specific cell, system information indicating a timing at which the specific cell broadcasts service information for MBMS, wherein the service information is directly acquired by a specific base station corresponding to the specific cell from a general base station corresponding to the general cell via an interface between base stations, and
   receive, from the specific cell, the service information broadcasted from the specific cell at the timing indicated by the system information broadcasted from the specific cell.

4. A specific base station that manages a specific cell in a mobile communication system including a general cell supporting a broadcasting of MBMS data and the specific cell not supporting the broadcasting of the MBMS data, comprising:
   a processor configured to
   directly acquire service information for MBMS from a general base station corresponding to the general cell via an interface between base stations;
   broadcast system information indicating a timing of a broadcasting of the service information; and
   broadcast the service information at the timing indicated by the system information.

5. A processor in a mobile terminal that receives MBMS data in a mobile communication system including a general cell supporting a broadcasting of the MBMS data and a specific cell not supporting the broadcasting of the MBMS data, the processor configured to:
   receive, from the specific cell, system information indicating a timing of a broadcasting of service information for MBMS, wherein the service information is directly acquired by a specific base station corresponding to the specific cell from a general base station corresponding to the general cell via an interface between base stations; and
   receive, from the specific cell, the service information broadcasted from the specific cell at the timing indicated by the system information broadcasted from the specific cell.

* * * * *